United States Patent [19]
Ori

[11] Patent Number: 5,768,021
[45] Date of Patent: Jun. 16, 1998

[54] IMAGING LENS FOR READING OUT IMAGE

[75] Inventor: Tetsuya Ori, Omiya, Japan

[73] Assignee: Fuji Photo Optical Co., Ltd., Omiya, Japan

[21] Appl. No.: 775,204

[22] Filed: Dec. 30, 1996

[30] Foreign Application Priority Data

Feb. 1, 1996 [JP] Japan .................. 8-040481

[51] Int. Cl.$^6$ .................................. G02B 27/10
[52] U.S. Cl. ................. 359/618; 359/639; 359/621
[58] Field of Search ............................ 359/618, 621, 359/626, 639

[56] References Cited

U.S. PATENT DOCUMENTS 5,329,363  7/1994  Moskovich .................. 359/642
5,555,133  9/1996  Tanaka .......................... 359/642

Primary Examiner—Frank G. Font
Assistant Examiner—Reginald A. Ratliff
Attorney, Agent, or Firm—Ronald R. Snider

[57] ABSTRACT

The temperature coefficient of refractive index in each lens constituting an imaging lens is controlled such that the amount of change in the imaging position due to change in the imaging lens upon temperature alleviates the positional deviation between the imaging position and the light-receiving surface caused by members other than the imaging lens, thereby preventing the read-out accuracy from deteriorating. The amount of change in the imaging position caused by change in the refractive index of lenses upon change in temperature is adjusted so as to alleviate the positional deviation between the imaging position and light-receiving surface due to the thermal expansion of the member unitedly holding the light source, lenses, and receiving optics.

4 Claims, 5 Drawing Sheets

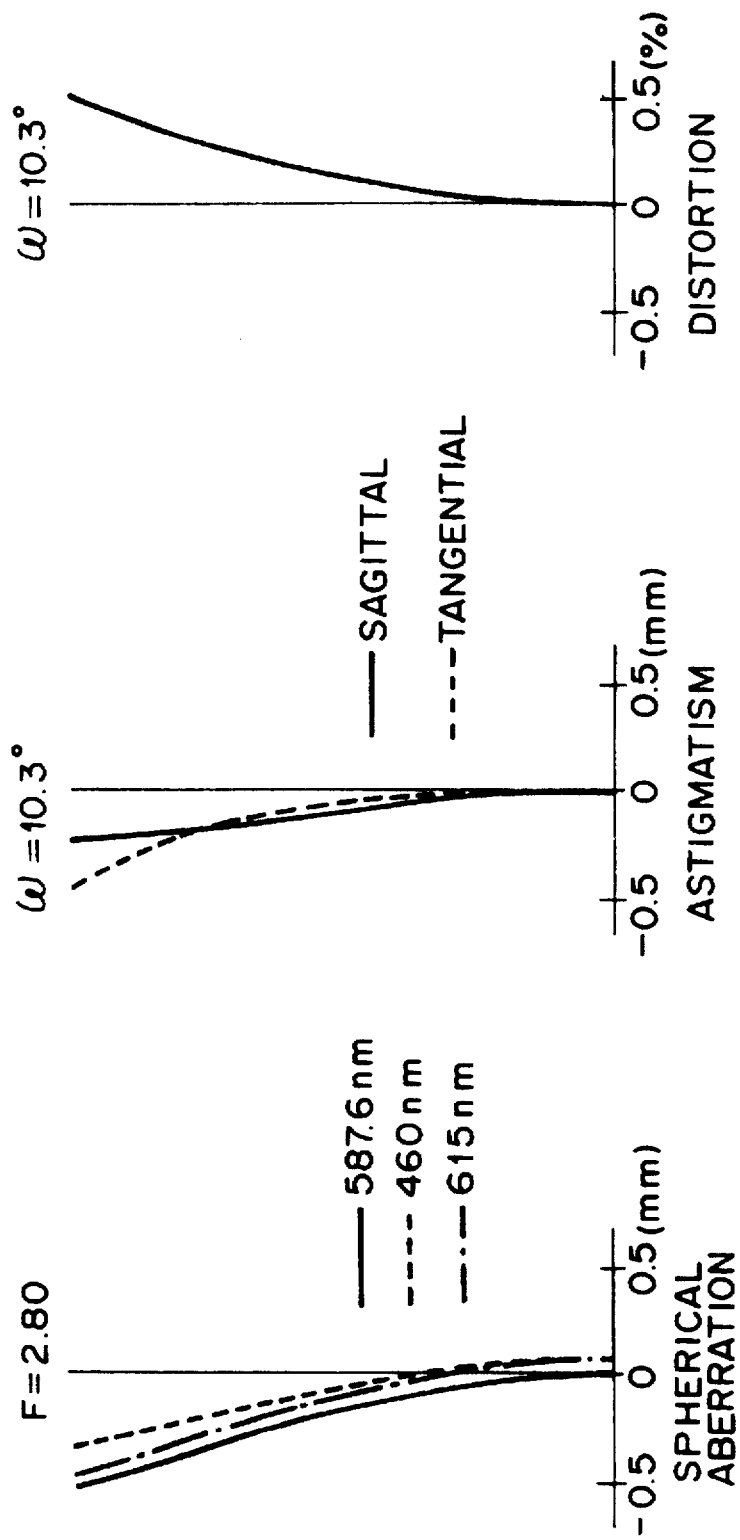

COMA
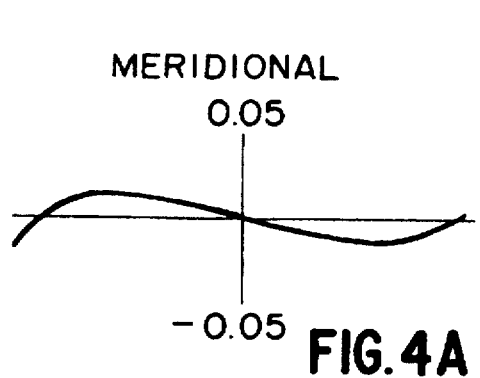
FIG. 4A — MERIDIONAL, 10.3°
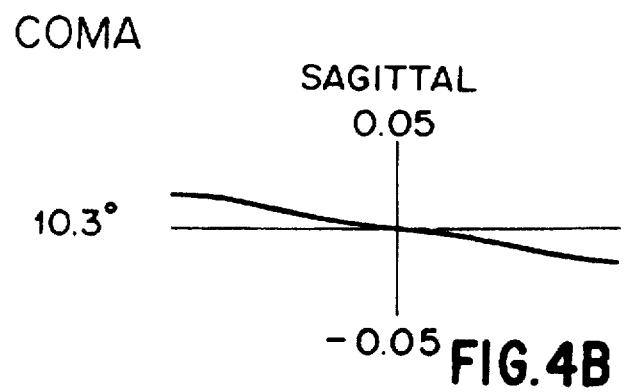
FIG. 4B — SAGITTAL, 10.3°
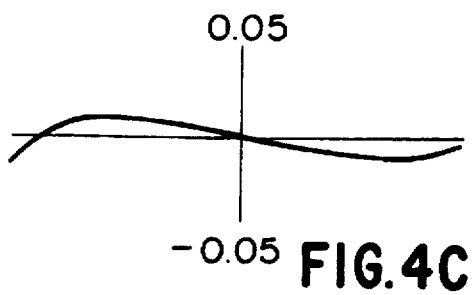
FIG. 4C — 9.3°
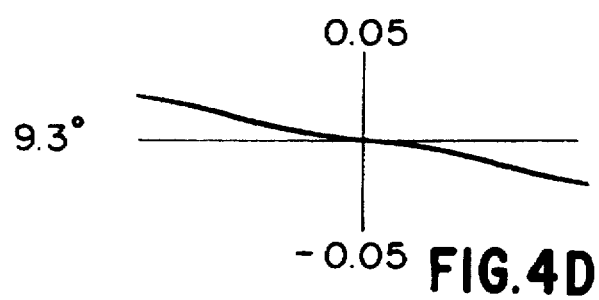
FIG. 4D — 9.3°
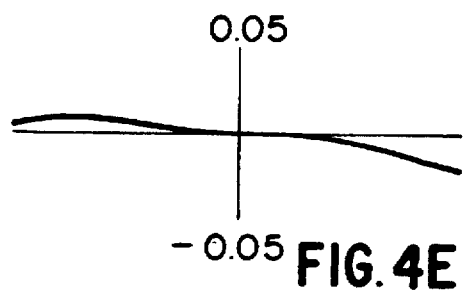
FIG. 4E — 6.3°
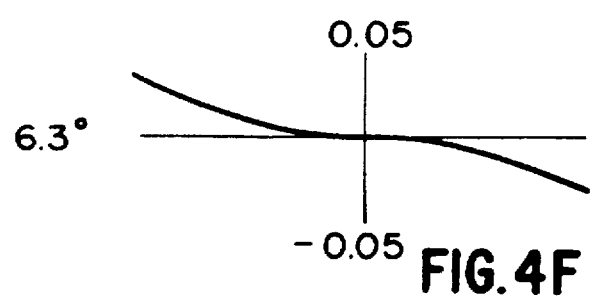
FIG. 4F — 6.3°
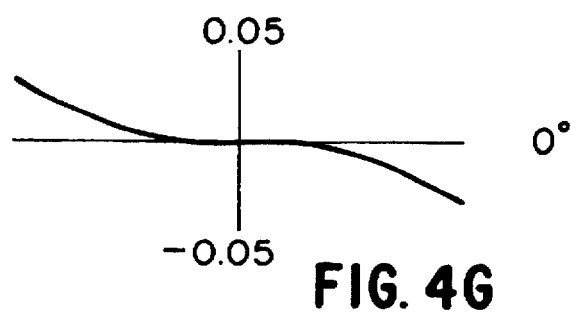
FIG. 4G — 0°

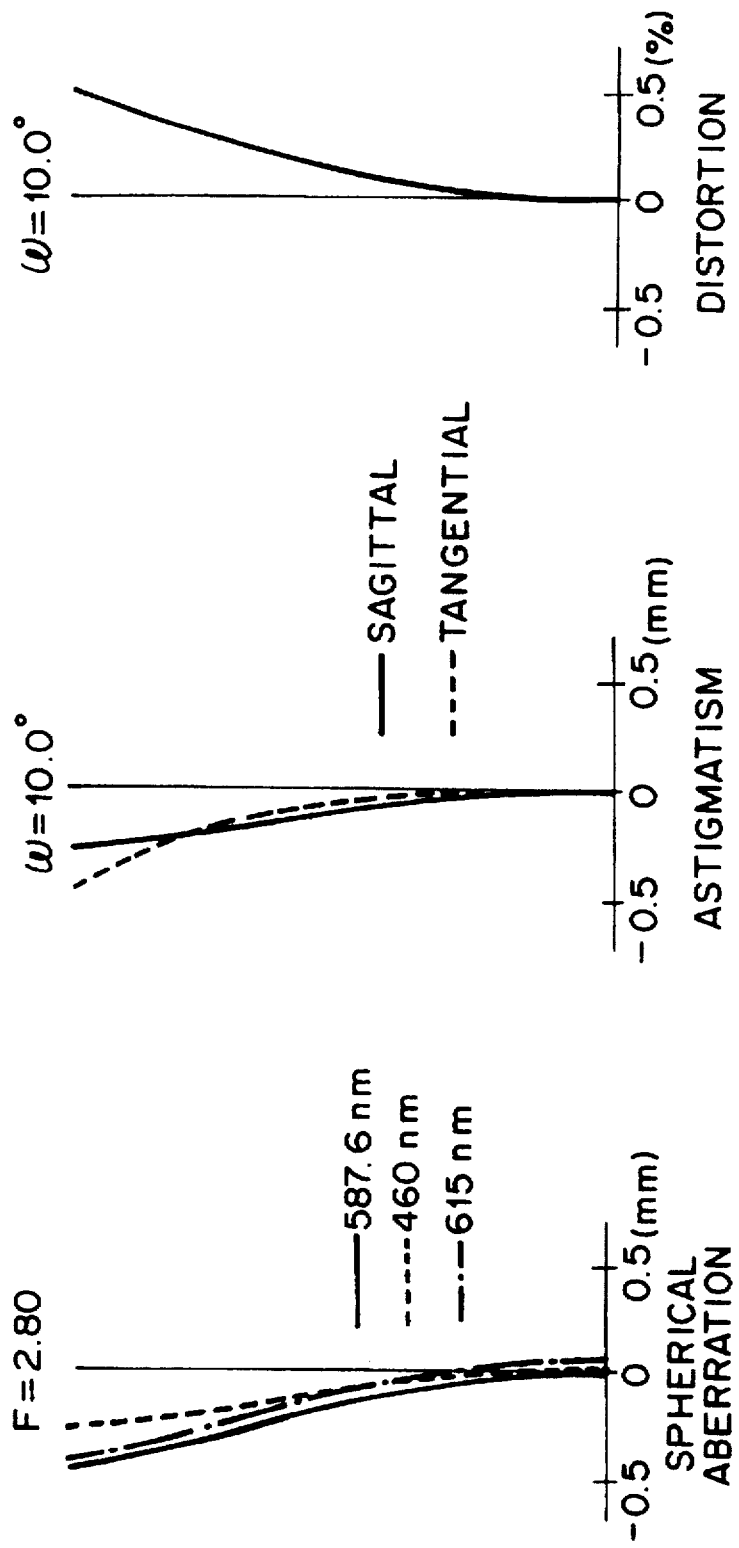

MERIDIONAL   COMA   SAGITTAL
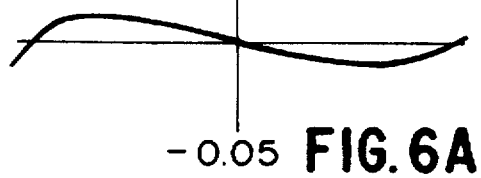
FIG. 6A    10°    FIG. 6B
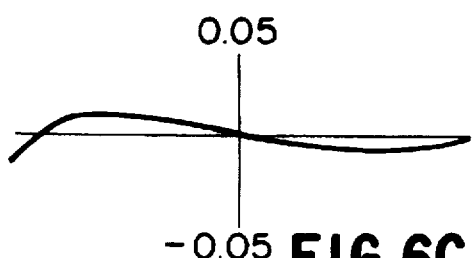 
FIG. 6C    9°    FIG. 6D
 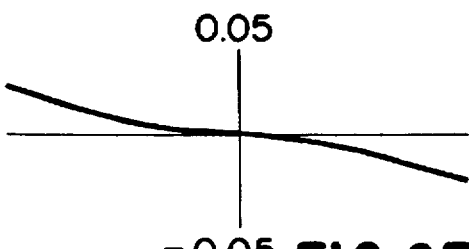
FIG. 6E    6.1°    FIG. 6F
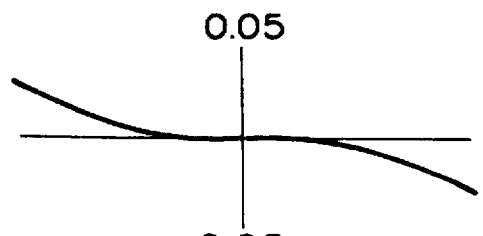
FIG. 6G    0°

IMAGING LENS FOR READING OUT IMAGE

RELATED APPLICATIONS

This application claims the priority of Japanese Patent Application No. 8-40481 filed on Feb. 1, 1996, which is incorporated herein by reference.

BACKGROUND OF THE INVENTION

1. Field of the Invention

The present invention relates to an imaging lens for reading out an image and, in particular, to such a lens used for image read-out apparatus such as copying machine or facsimile machine.

2. Description of the Prior Art

In an image read-out apparatus such as facsimile machine, since its image quality deteriorates due to deviation in the imaging position of the imaging lens, it is desirable that the imaging lens and the position at which an image is to be formed have a fixed relative positional relationship therebetween.

Accordingly, various kinds of members for forming the image, such as light source, imaging lens, and receiving optics, are often unitedly held on a holding table with a predetermined distance therebetween.

In such an image read-out apparatus, however, ambient temperature gradually increases during a period from its actuation till the time when it attains a steady temperature state. Together with this increase in temperature, the above-mentioned holding table may yield thermal expansion, thereby changing the distance between the light source and the imaging lens or the distance between the imaging lens and the receiving optics.

Accordingly, even when each member is set at its optimal position in the normal temperature state, the imaging position may shift from its original position on the light-receiving surface of the receiving optics, thereby deteriorating the accuracy in reading out images. Such a phenomenon may become further problematic in the case where an enlarging optical system is used.

SUMMARY OF THE INVENTION

In view of such a circumstance, the object of the present invention is to provide an imaging lens for reading out an image, which can easily compensate for the positional deviation between its imaging position and light-receiving surface caused by thermal expansion of members around the imaging lens corresponding to change in temperature of environment.

In the imaging lens for reading out an image in accordance with the present invention, a lens constituting the imaging lens has a temperature coefficient of refractive index which is adjusted such that an amount of positional deviation between an imaging position and a light-receiving surface caused by thermal expansion of a member around the imaging lens corresponding to change in temperature of environment is decreased by change in the imaging position caused by change in the imaging lens upon temperature.

Preferably, the imaging lens includes a convex first lens and a concave second lens, while the first lens has a temperature coefficient of refractive index smaller than that of the second lens.

Here, "member around the imaging lens" mentioned above refers to, of members other than the imaging lens, various members which can generate positional deviation between the imaging position and the light-receiving surface due to increase in temperature.

BRIEF DESCRIPTION OF THE DRAWINGS

FIG. 3 is an aberration chart (for spherical aberration, astigmatism, and distortion) of the lens in accordance with Embodiment 1;

FIG. 4 is an aberration chart showing coma of the lens in accordance with Embodiment 1;

FIG. 5 is an aberration chart (for spherical aberration, astigmatism, and distortion) of the lens in accordance with Embodiment 2; and FIG. 6 is an aberration chart showing coma of the lens in accordance with Embodiment 2.

DETAILED DESCRIPTION OF THE PREFERRED EMBODIMENTS

Figure 1:
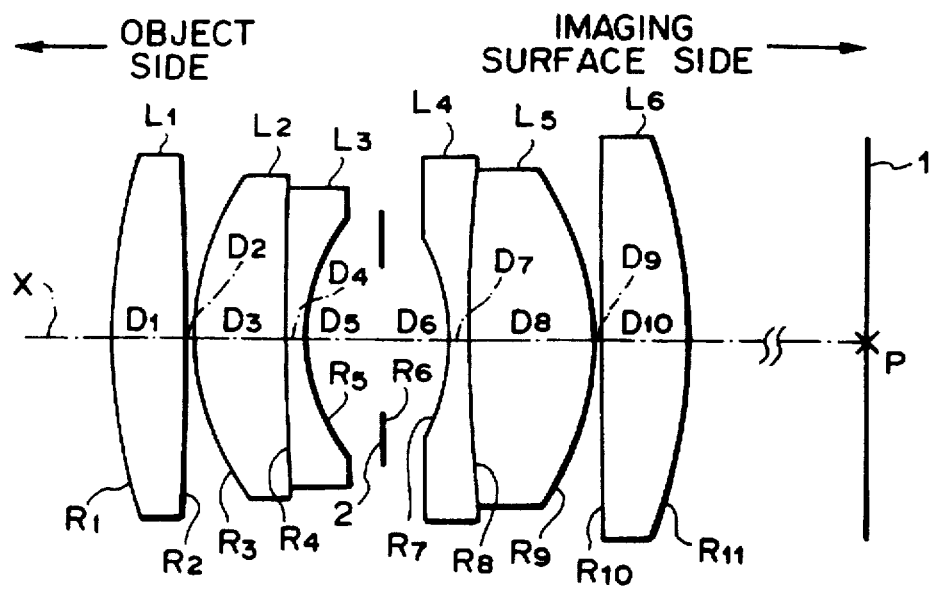
FIG. 1 is a schematic view showing a basic lens configuration in accordance with Embodiments 1 and 2 of the present invention.

In the following, embodiments of the present invention will be explained with reference to drawings. Here, FIG. 1 shows a basic lens configuration of Embodiments 1 and 2. As shown in FIG. 1, the imaging lens for reading out an image (simply referred to as "imaging lens" hereinafter) having a temperature correcting function in accordance with these embodiments is a four-group, six-sheet Gaussian lens system constituted by six sheets of lenses $L_1$ to $L_6$, in which the second lens $L_2$ and third lens $L_3$ are cemented together, the fourth lens $L_4$ and fifth lens $L_5$ are cemented together, and a stop 2 is disposed between the third lens $L_3$ and fourth lens $L_4$, whereby a luminous flux incident on the imaging lens from the object side along an optical axis X is made incident on an imaging position P on an imaging surface 1.

Here, the first lens $L_1$ is a biconvex lens having a surface with a stronger curvature directed onto the object side, the second lens $L_2$ is a positive meniscus lens having a convex surface directed onto the object side, the third lens $L_3$ is a negative meniscus lens having a convex surface directed onto the object side, the fourth lens $L_4$ is a biconcave lens having a surface with a stronger curvature directed onto the object side, the fifth lens $L_5$ is a biconvex lens having a surface with a stronger curvature directed onto the imaging surface side, and the sixth lens $L_6$ is a biconvex lens having a surface with a stronger curvature directed onto the imaging surface side.

Figure 2:
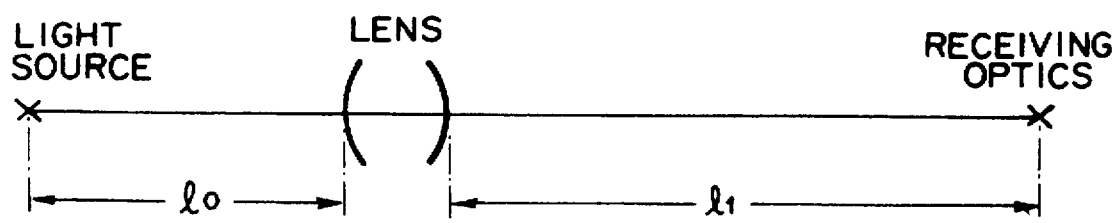
FIG. 2 is a view conceptually showing the basic configuration of a system including the lens shown in FIG. 1.

Here, the above-mentioned imaging lens is used for forming an image of light from a light source onto a receiving optics. These three elements have a relationship therebetween schematically shown in FIG. 2.

Namely, assuming that the distance between the light source and imaging lens after temperature has changed is $l_o'$ and that the distance between the imaging lens and the receiving optics after temperature has changed is $l_i'$, the following expressions (1) and (2) are obtained:

$$l_o' = l_o \times (1 + \alpha_1 \cdot \Delta T) \tag{1}$$

$$l_i' = l_i \times (1 + \alpha_2 \cdot \Delta T) \tag{2}$$

wherein $\alpha_1$ is coefficient of thermal expansion of material between the light source and the imaging lens;

$\alpha_2$ is coefficient of thermal expansion of material between the imaging lens and the receiving optics;

$\Delta T$ is change in temperature (° C.);

$l_o$ is distance between the light source and imaging lens before temperature changes; and $l_i$ is distance between the imaging lens and receiving optics before temperature changes.

Here, assuming that optical magnification (lateral magnification) is $\beta$, distance $\Delta$ between the imaging position and receiving optics after temperature has changed is represented by the following expression (3):

$$\Delta = l_o \cdot \alpha_1 \cdot \Delta T \cdot \beta^2 + l_i \cdot \alpha_2 \cdot \Delta T \tag{3}$$

Here, specific values of the above-mentioned distance $\Delta$ in cases where the material of the member unitedly holding the light source, imaging lens, and receiving optics is made of iron and where this material is made of plastic are determined as follows. Example 1: Case with Iron Assuming that $\alpha_1 = \alpha_2 = 11.8 \times 10^{-6}$/κ, $l_o = 112.4$, $l_i = 218.6$, $\Delta T = 30$, and $\beta = -1.84$;

from the above expression (3), $\Delta = 212$ μm (on the lens side of the receiving optics). Example 2: Case with Plastic Assuming that $\alpha_1 = \alpha_2 = 42.0 \times 10^{-6}$/κ, $l_o = 112.8$, $l_i = 214.2$, $\Delta T = 30$, and $\beta = -1.84$;

$\Delta = 751$ μm (on the lens side of the receiving optics).

Thus, due to thermal expansion caused by change in the holding member or the like, the imaging position and the light-receiving surface deviate from each other, thereby deteriorating the read-out accuracy, and further causing such a problem as deterioration of image quality.

Therefore, in the imaging lens of the present invention, the imaging lens itself has a function for compensating for the positional deviation between the imaging position and the light-receiving surface caused by the above-mentioned change in temperature.

Namely, the temperature coefficient of refractive index in each constituent lens is adjusted such that the amount of change in the imaging position due to change in the imaging lens upon temperature alleviates the positional deviation between the imaging position and the light-receiving surface caused by the above-mentioned holding member or the like.

In the following, the present invention will be explained in further detail with reference to two embodiments thereof.

Embodiment 1

Table 1 (follows) shows radius of curvature R (mm) of each lens surface, center thickness of each lens and air gap between neighboring lenses D (mm), refractive index N of each lens at d-line, and Abbe number ν of each lens in Embodiment 1.

Here, in Table 1 as well as in Table 3 (follows) which will be shown later, the reference numbers corresponding to each of the marks R, D, N, and ν successively increase from the object side.

Also, the lower portion of Table 1 shows values of the F number, focal length f', lateral magnification $\beta$, and half field angle ω of the whole lens system in the imaging lens of this embodiment.

Further, Table 2 (follows) shows the values of temperature coefficient of refractive index $\Delta N(\times 10^{-6}$/κ(at 20° C.)) and coefficient of linear expansion $\alpha(\times 10^{-7}$/κ) for each lens in this embodiment.

As shown in Table 2, in this embodiment, among the lenses constituting cemented lenses, the convex lenses $L_2$ and $L_5$ are set to have temperature coefficients of refractive index smaller than those of the concave lenses $L_3$ and $L_4$, thereby generating the above-mentioned temperature correcting function.

In thus configured imaging lens of this embodiment, assuming that temperature T has changed from 20° C. to 50° C. ($\Delta T = 30$), the focal length f' changes from 100.00 mm to 100.039 mm (+39 μm), and its imaging position Img when the object point length is fixed to 112.4 mm changes from 218.648 mm to 218.836 mm (+188 μm).

Accordingly, when the holding member is made of iron as mentioned above, the amount of deviation $\Delta$ between the imaging position and light-receiving surface becomes 24 μm as being corrected by 188 μm since the amount of deviation $\Delta$ due to the holding member is 212 μm.

Embodiment 2

Table 3 shows radius of curvature R (mm) of each lens surface, center thickness of each lens and air gap between neighboring lenses D (mm), refractive index N of each lens at d-line, and Abbe number ν of each lens in Embodiment 2.

Also, the lower portion of Table 3 shows values of the F number, focal length f', lateral magnification $\beta$, and half field angle ω of the whole lens system in the imaging lens of this embodiment.

Further, Table 4 (follows) shows the values of temperature coefficient of refractive index $\Delta N(\times 10^{-6}$/κ(at 20° C.)) and coefficient of linear expansion $\alpha(\times 10^{-7}$/κ) for each lens in this embodiment.

As shown in Table 4, in this embodiment, among the lenses constituting cemented lenses, the convex lenses $L_2$ and $L_5$ are set to have temperature coefficients of refractive index smaller than those of the concave lenses $L_3$ and $L_4$, thereby generating the above-mentioned temperature correcting function.

In thus configured imaging lens of this embodiment, assuming that temperature T has changed from 20° C. to 50° C. ($\Delta T = 30$), the focal length f' changes from 100.00 mm to 100.103 mm (+103 μm), and its imaging position Img when the object point length is fixed to 112.8 mm changes from 214.154 mm to 214.970 mm (+816 μm).

Accordingly, when the holding member is made of plastic as mentioned above, the amount of deviation $\Delta$ between the imaging position and light-receiving surface becomes 65 μm as being corrected by 816 μm since the amount of deviation $\Delta$ due to the holding member is 751 μm.

In each of the foregoing two embodiments, in the two lens groups constituting the cemented lenses, the convex lenses $L_2$ and $L_5$ have small dispersions, whereas the concave lenses $L_3$ and $L_4$ have large dispersions, thereby yielding an achromatic effect. Accordingly, the imaging lens of these embodiments can be used in a wide range of wavelength.

FIGS. 3 to 6 are aberration charts corresponding to Embodiments 1 and 2. Namely, FIG. 3 shows aberration charts of spherical aberration, astigmatism, and distortion in Embodiment 1; FIG. 4 shows an aberration chart of coma in Embodiment 1; FIG. 5 shows aberration charts of spherical aberration, astigmatism, and distortion in Embodiment 2; and FIG. 6 shows an aberration chart of coma in Embodiment 2.

Each spherical aberration chart shows aberrations with respect to light with wavelengths at 587.6 nm, 460 nm, and 615 nm. Also, each astigmatism chart shows aberrations with respect to sagittal and tangential image surfaces.

As can be seen from FIGS. 3 to 6, all the above-mentioned various kinds of aberration can be made favorable in the above-mentioned embodiments.

Without being restricted to the foregoing embodiments, the imaging lens of the present invention can be modified in various manners. For example, the radius of curvature R, lens spacing (or lens thickness) D, refractive index N, and Abbe number ν of each lens as well as temperature coefficient of refractive index ΔN and coefficient of linear expansion α can be appropriately changed.

Also, while the imaging lens is constituted by a four-group, six-sheet Gaussian type which can yield favorable results with a small number of lens sheets in the foregoing embodiments, other numbers of lenses may be used, of course.

As explained in the foregoing, in the imaging lens for reading out an image in accordance with the present invention, the temperature coefficient of each constituent lens is appropriately selected such that the amount of movement of the imaging position generated due to change in temperature is set to a predetermined value, thereby reducing the amount of deviation in the imaging position caused by thermal expansion of the holding member or the like which unitedly holds the light source, imaging lens, receiving optics, and the like. Accordingly, it can prevent the imaging position and the position of the light-receiving surface from greatly deviating from each other, whereby the deterioration of read-out accuracy as well as the deterioration in read-out image quality can be prevented.

TABLE 1

| Surface No. | R | D | N | ν |
|---|---|---|---|---|
| 1 | 83.136 | 11.03 | 1.80420 | 46.50 |
| 2 | −591.34 | 0.72 | | |
| 3 | 40.183 | 12.96 | 1.80420 | 46.50 |
| 4 | 417.51 | 2.65 | 1.69895 | 30.05 |
| 5 | 27.552 | 10.74 | | |
| 6 | ∞ | 9.67 | | |
| 7 | −30.363 | 2.54 | 1.80518 | 25.46 |
| 8 | 219.56 | 17.97 | 1.58144 | 40.89 |
| 9 | −42.707 | 0.72 | | |
| 10 | 9336.3 | 12.21 | 1.51680 | 37.34 |
| 11 | −83.907 | | | |

$F_{no}$ 2.8, f' = 100, Lateral magnification β = −1.84, Half field angle ω = 10.3°

TABLE 2

| | <Temperature Coefficient of Lenses> | |
|---|---|---|
| Lens | Temperature coefficient of refractive index ΔN (× $10^{-6}$/κ, at 20° C.) | Coefficient of linear expansion α (× $10^{-7}$/κ) |
| $L_1$ | 4.0 | 63 |
| $L_2$ | 4.0 | 63 |
| $L_3$ | 4.9 | 85 |
| $L_4$ | 9.6 | 79 |
| $L_5$ | 2.3 | 89 |
| $L_6$ | 8.5 | 59 |

TABLE 3

| Surface No. | R | D | N | ν |
|---|---|---|---|---|
| 1 | 83.232 | 10.65 | 1.80420 | 46.50 |
| 2 | −671.00 | 0.71 | | |
| 3 | 37.658 | 12.10 | 1.80420 | 46.50 |
| 4 | 233.02 | 2.48 | 1.68893 | 31.16 |
| 5 | 26.750 | 12.14 | | |
| 6 | ∞ | 10.72 | | |
| 7 | −29.769 | 2.48 | 1.80518 | 25.46 |
| 8 | 177.83 | 18.17 | 1.56908 | 71.3 |
| 9 | −41.022 | 0.71 | | |
| 10 | 864.69 | 11.36 | 1.80518 | 25.46 |
| 11 | −89.950 | | | |

$F_{no}$ 2.8, f' = 100, Lateral magnification β = −1.84, Half field angle ω = 10.0°

TABLE 4

| | <Temperature Coefficient of Lenses> | |
|---|---|---|
| Lens | Temperature coefficient of refractive index ΔN (× $10^{-6}$/κ) | Coefficient of linear expansion α (× $10^{-7}$/κ) |
| $L_1$ | 4.0 | 63 |
| $L_2$ | 4.0 | 63 |
| $L_3$ | 5.6 | 82 |
| $L_4$ | 9.6 | 79 |
| $L_5$ | −96 | 156 |
| $L_6$ | 0.5 | 93 |

What is claimed is:

1. An imaging lens for reading out an image in which a lens constituting said imaging lens has a temperature coefficient of refractive index which is adjusted such that an amount of positional deviation between an imaging position and a light-receiving surface caused by thermal expansion of a member around said imaging lens corresponding to change in temperature of environment is decreased by change in the imaging position caused by change in said imaging lens caused by temperature change of the lens.

2. An imaging lens according to claim 1, wherein said imaging lens includes a convex first lens and a concave second lens, said first lens having a temperature coefficient of refractive index smaller than that of said second lens.

3. An imaging lens for an optical system in which a lens constituting said imaging lens has a temperature coefficient of refractive index such that an amount of positional deviation between an imaging position and a light-receiving surface caused by thermal expansion of material of said optical system corresponding to change in temperature is decreased by change in the imaging position caused by change in said imaging lens caused by temperature change.

4. An imaging lens according to claim 3, wherein said imaging lens includes a convex first lens and a concave second lens, said first lens having a temperature coefficient of refractive index smaller than that of said second lens.

\* \* \* \* \*